United States Patent
Zhang et al.

(10) Patent No.: US 6,252,313 B1
(45) Date of Patent: Jun. 26, 2001

(54) APPARATUS AND METHOD FOR MINIMIZING ELECTROMAGNETIC INTERFERENCE IN MICROCOMPUTING SYSTEMS

(75) Inventors: Michael T. Zhang, Portland; Don Weiss, Beaverton; James Webb; Steve Lofland, both of Portland, all of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 08/990,902

(22) Filed: Dec. 15, 1997

(51) Int. Cl.[7] .................................... H04B 15/02
(52) U.S. Cl. ............................ 307/91; 361/800
(58) Field of Search .................... 206/709, 719; 307/91; 361/737, 800, 816, 818; 174/35 R

(56) References Cited

U.S. PATENT DOCUMENTS

| | | | |
|---|---|---|---|
| 4,622,527 | * 11/1986 | Carlson | 333/182 |
| 5,490,030 | * 2/1996 | Taylor et al. | 361/45 |
| 5,659,459 | * 8/1997 | Wakabayashi et al. | 361/753 |
| 5,777,856 | * 7/1998 | Phillips et al. | 361/816 |
| 5,838,542 | * 11/1998 | Nelson et al. | 361/704 |

\* cited by examiner

*Primary Examiner*—Josie Ballato
*Assistant Examiner*—Robert L. DeBeradinis
(74) *Attorney, Agent, or Firm*—Blakely, Sokoloff, Taylor & Zafman LLP

(57) ABSTRACT

An apparatus and method for minimizing electromagnetic interference in a microcomputing system. The apparatus and method of the present invention are based on the fundamental aspect of providing an EMI shield specifically dimensioned to receive a microprocessor within the microcomputing system. The apparatus and method of the present invention are further based on the aspect of providing at least one ferrite bead along a power delivery path to attenuate any high-frequency leakage current from the microprocessor that results at the resonant frequencies of the EMI shield.

12 Claims, 8 Drawing Sheets

APPARATUS AND METHOD FOR MINIMIZING ELECTROMAGNETIC INTERFERENCE IN MICROCOMPUTING SYSTEMS

BACKGROUND OF THE INVENTION

1. Field of the Invention

The present invention relates generally to the field of microcomputing, and, more particularly, to an apparatus and method for minimizing electromagnetic interference in microcomputing systems.

2. Description of the Related Art

In the field of microcomputing, an increasingly high premium is placed on maximizing processing speed. One of the major limitations when attempting to increase processing speed is the emission of electromagnetic interference (EMI) from the microprocessors employed in such microcomputing systems. EMI is a speed limiting factor in microcomputing systems because it has a tendency to create unwanted high-frequency current loops in the motherboard of the microcomputing system. More specifically, the unwanted current loops on the motherboard emit high-frequency EMI known to interfere with the communications frequencies regulated by the Federal Communications Commission (FCC). To avoid running afoul of FCC regulations against interfering with communications frequencies, it may be necessary to limit the speed at which microprocessors are operated so as to curtail the amount of high-frequency EMI.

Various efforts have been undertaken in the prior art to combat the problem of EMI in microcomputing systems. One approach calls for providing the various conductor traces on the motherboard in a special layout so as to minimize EMI. However, this special trace routing is disadvantageous in that it consumes a fair amount of space on the motherboard, which, as will be appreciated, cuts against the overall goal of minimizing the size of microcomputing systems. Another approach involves adding local decoupling capacitors along the input lines of the microprocessor for the purpose of minimizing EMI. This approach is also problematic in that it is costly in terms of both space and money, and, furthermore, is ineffective at thwarting high frequency EMI. A still further approach involves employing multiple-layer motherboards specifically designed to minimize the amount of EMI. While such multi-layer motherboards are generally effective at minimizing EMI, the concomitant high cost of manufacture is a strong deterrent to any widespread acceptance.

Perhaps the most common technique for controlling EMI involves constructing the chassis of the microcomputing systems from a metal shield material such that any EMI generated by the motherboard and microprocessor is contained within the chassis structure. The main drawback of this technique is that high frequency EMI can readily escape from the vent openings required for cooling the microcomputing systems. Each of the foregoing prior art approaches fails in at least one significant respect, thereby precipitating the need for an improved apparatus and method for reducing EMI in microcomputing systems.

The present invention is directed at overcoming, or at least reducing the effects of, one or more of the problems set forth above.

SUMMARY OF THE INVENTION

In one aspect of the present invention, an improvement is provided within a microcomputing system having a microprocessor disposed within a chassis assembly. The improvement comprises shield means disposed about the microprocessor for preventing the emission of electromagnetic interference generated by the microprocessor.

In a still further broad aspect of the present invention, a method is provided for preventing the emission of electromagnetic interference from a microcomputing system having a microprocessor. The method comprises the step of disposing the microprocessor within shielding means for shielding electromagnetic interference generated by the microprocessor.

BRIEF DESCRIPTION OF THE DRAWINGS

Other objects and advantages of the invention will become apparent upon reading the following detailed description and upon reference to the drawings in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
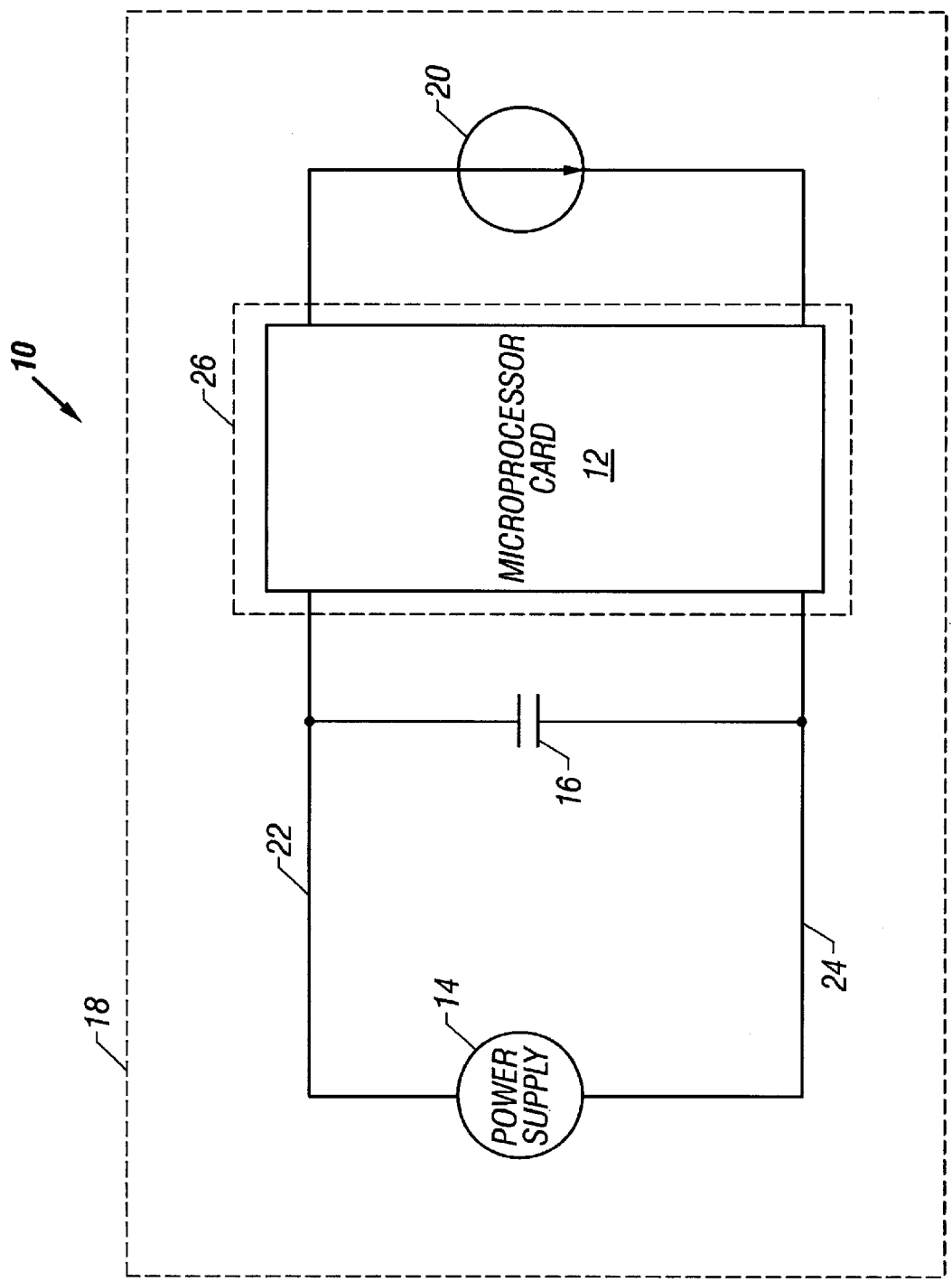
FIG. 1 is a schematic diagram of a microcomputing system having a microprocessor card disposed within an EMI shield in accordance with one embodiment of the present invention.

With initial reference to FIG. 1, shown is a microcomputing system 10 incorporating an apparatus and method for reducing EMI in accordance with one embodiment of the present invention. In its most generic form, the microcomputing system 10 includes a microprocessor card 12, a power supply 14, and a decoupling capacitor 16, all of which are disposed within a metal chassis structure 18. The microprocessor card 12 includes a microprocessor (not shown) having a current load denoted schematically at 20. The power supply 14 supplies power to the microprocessor card 12 via a power delivery path 22 and a ground path 24. The decoupling capacitor 16 extends between the power delivery path 22 and ground path 24 and serves as a first line of defense against the leakage of local high-frequency EMI from the microprocessor card 12 to a motherboard (not shown). The chassis structure 18 typically takes the form of a metal enclosure that houses the electronics of the microcomputing system 10, thereby providing additional protection against the emission of EMI generated within the microcomputing system 10. The aforementioned components of the microcomputing system 10 are well known in the art, and, as such, a detailed discussion of these components is not included herein so as to avoid unnecessarily obscuring the invention. The microcomputing system 10 as described above may collectively take the form of a personal computer.

The present invention involves disposing the microprocessor card 12 within an EMI shield 26 specifically designed to minimize the emission of high-frequency EMI from the microprocessor card 12. By containing the high-frequency EMI in this fashion, the microprocessor (not shown) on the microprocessor card 12 can be operated at increasingly higher speeds without interfering with the frequency spectrum reserved for radio communications. The processing power of the microcomputing system 10 may therefore be increased to improve the operational efficiency and marketability of the microcomputing system 10. Moreover, as will be discussed in greater detail below, the EMI shield 26 may preferably be provided as part of a microprocessor cartridge (not shown) designed to enclose the microprocessor card 12 while disposed on a motherboard (not shown). In so doing, the problem of unwanted EMI may be solved without modifying the existing motherboard architecture, thereby reducing the cost of implementing the EMI shield 26.

Figure 2:
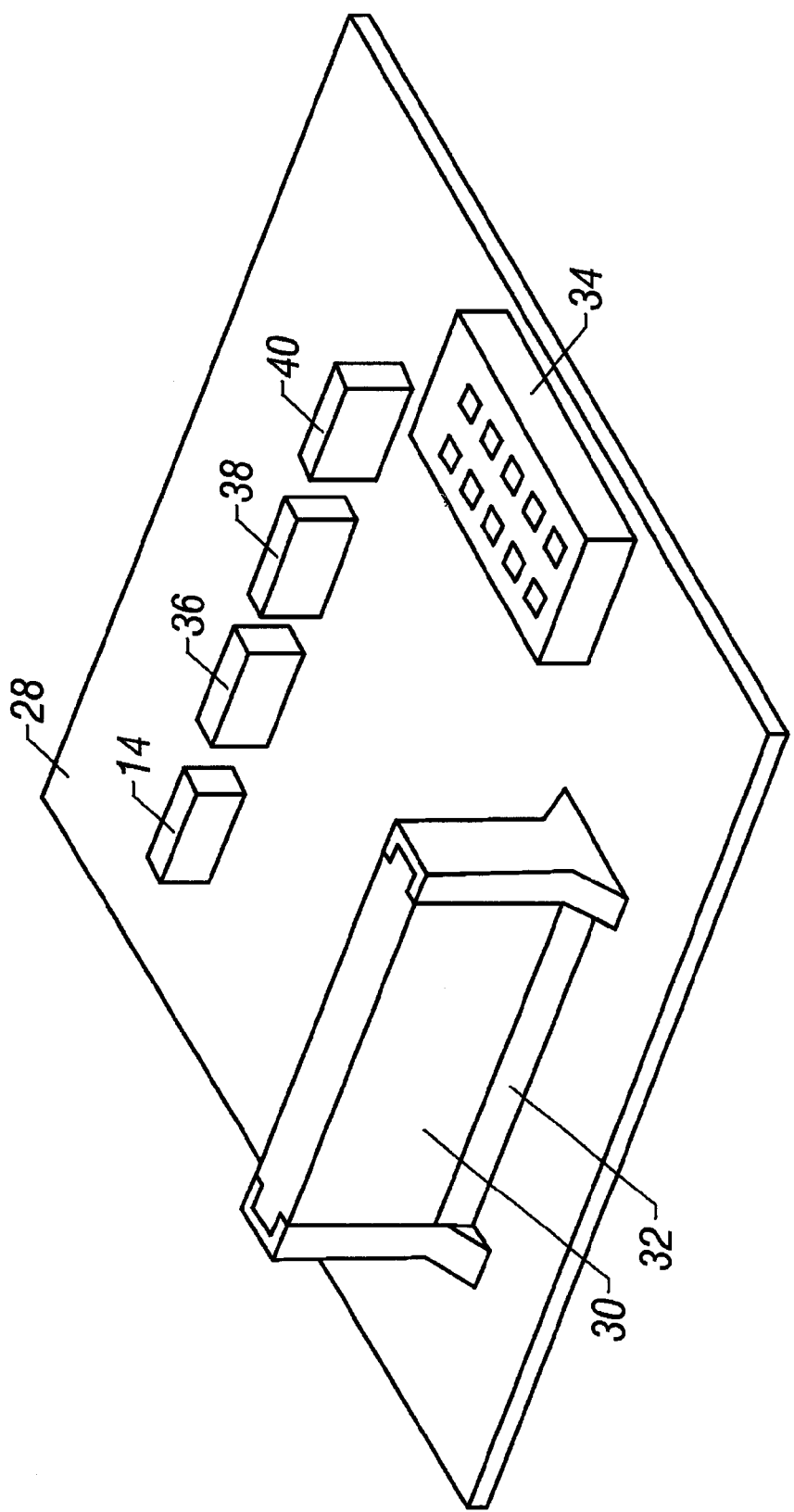
FIG. 2 is a perspective view of an exemplary motherboard having a microprocessor cartridge disposed thereon.

With reference to FIG. 2, shown is a motherboard 28 having a microprocessor cartridge 30 disposed thereon. The motherboard 28 is suitable for use within any number of microcomputing systems, including but not limited to commercially available personal computers. In a preferred embodiment, the microprocessor cartridge 30 is removably coupled to the motherboard 28 via a connector 32. As will be explained below, the microprocessor card 12 shown in FIG. 1 is disposed within the microprocessor cartridge 30 such that the microprocessor card 12 can communicate with the various components on the motherboard 28, and thus control the operation of the microcomputing system 10. The components on the motherboard 28 may include, for example, the power supply 14 for supplying power to the microprocessor cartridge 30, a connector 34 for coupling the motherboard 28 to other components and/or boards within the microcomputing system 10, and miscellaneous components, including memory devices 36–40.

Figure 3:
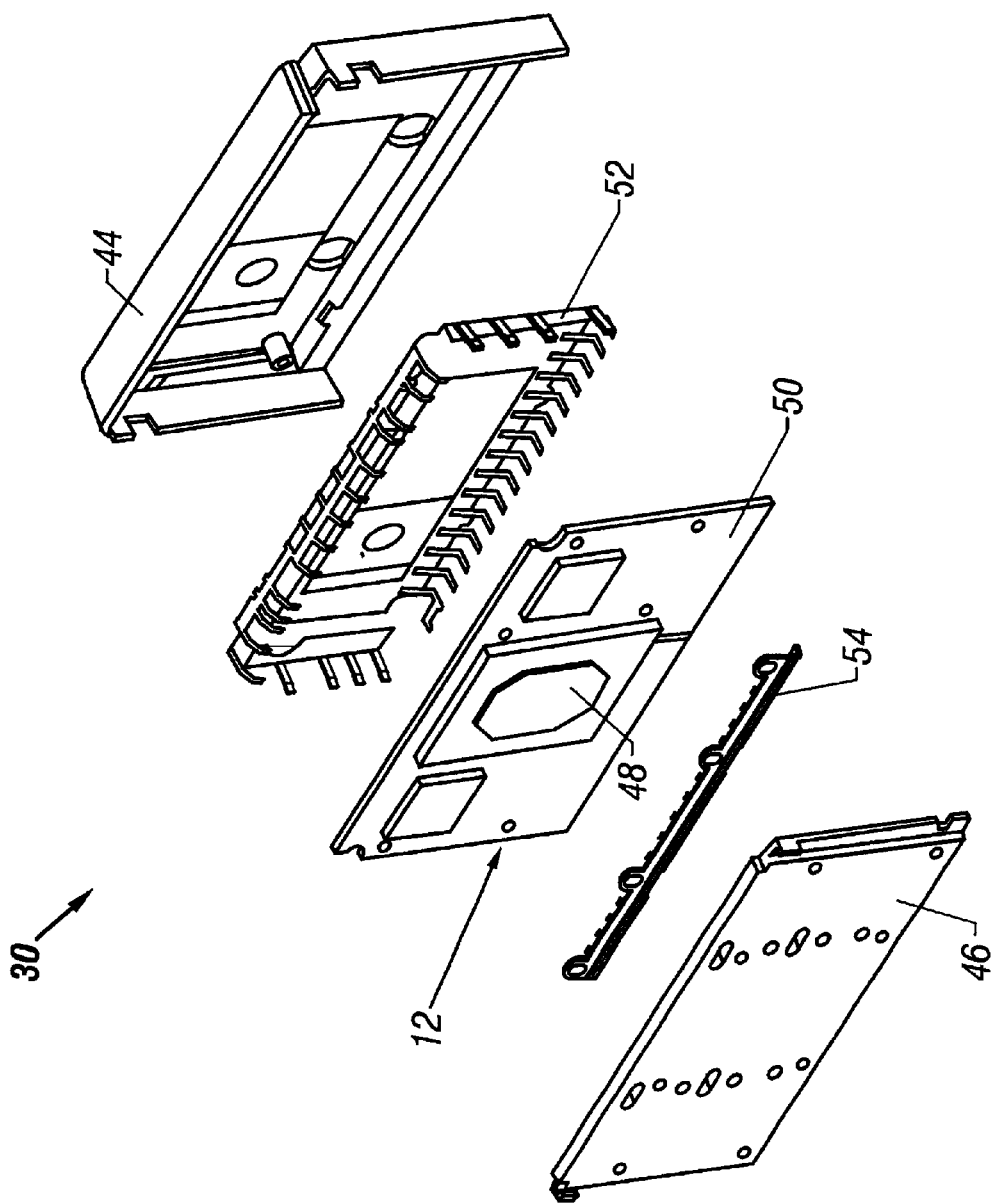
FIG. 3 is an exploded view of the microprocessor cartridge shown in FIG. 2 illustrating a microprocessor shield assembly in accordance with one embodiment of the present invention.

With reference to FIG. 3, the microprocessor cartridge 30 is shown in exploded form to readily illustrate the EMI shield of the present invention. The microprocessor cartridge 30 includes a plastic cover 44 and a metallic thermal plate 46, which cooperate to enclose the microprocessor card 12 therebetween. The microprocessor card 12 includes a microprocessor 48 disposed on a substrate 50. The microprocessor card 12 may be selected from any number of commercially available microprocessor cards. In a preferred embodiment, the EMI shield of the present invention comprises a first shield member 52 and a second shield member 54. The first and second shield members 52, 54 are preferably constructed from a metallic substance having suitable shielding properties, such as stainless steel, beryllium copper, etc.

Figure 4:
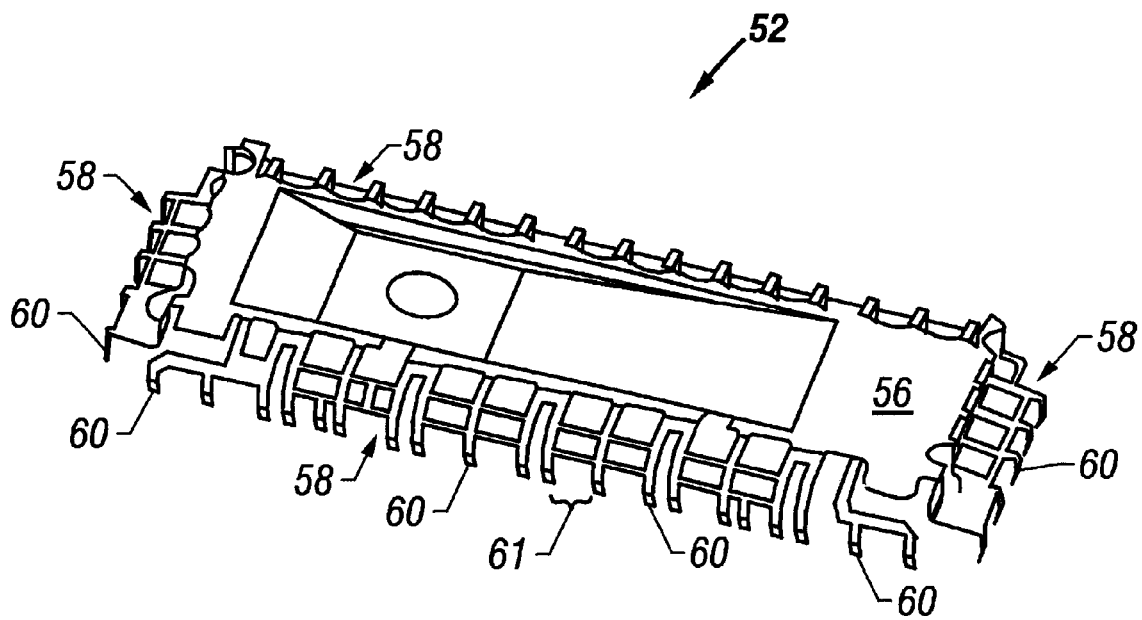
FIG. 4 is a perspective view of the first shield member shown in FIG. 3.

With reference to FIG. 4, the first shield member 52 includes a central portion 56, an apertured region 58 disposed about the periphery of the central portion 56, and a plurality of finger members 60 extending from the apertured region 58. The central shield portion 56 is generally solid in construction and provides a large degree of the EMI shielding capability. The apertured region 58 is constructed to provide a spring force for biasing the finger members 60 against both the thermal plate 46 and substrate 50 to ensure adequate electrical continuity therebetween. The size of openings 61 formed in the apertured region 58 may vary depending upon specific design considerations. The finger members 60 are designed to establish contact with various ground points along the substrate 50 of the microprocessor card 12, as well as the thermal plate 46. In one embodiment, the finger members 60 include rounded points to ensure single point contact with the substrate 50 and the thermal plate 46.

Figure 5:
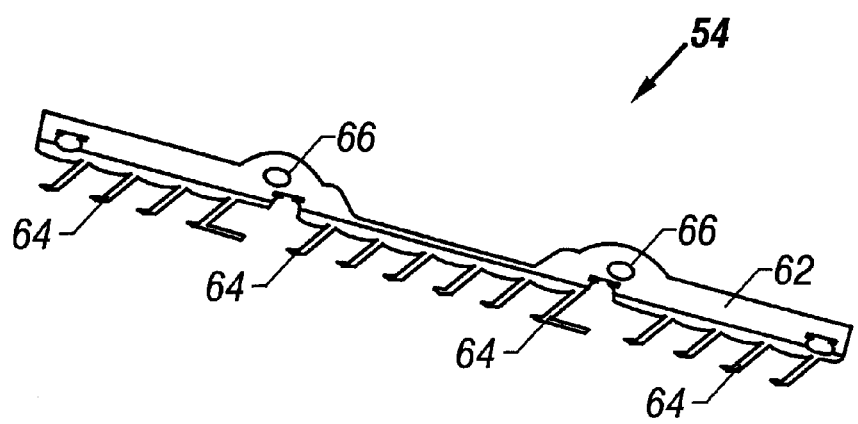
FIG. 5 is a perspective view of the second shield member shown in FIG. 3.

Turning to FIG. 5, the second shield member 54 includes an elongated base portion 62 and a plurality of finger members 64 extending therefrom. The base portion 62 includes apertures 66 for securing the second shield member 54 to the thermal plate 46. The finger members 64 are in one embodiment designed with rounded points to establish proper single point contact with various ground points along the substrate 50 of the microprocessor card 12. In this configuration, the second shield member 54 forms a conductive link or bridge between the thermal plate 46 and the ground plane of the microprocessor card 12. This is advantageous in that it exploits the inherent shielding properties of the metallic thermal plate 46, thereby eliminating the need and cost of providing another large shield member in addition to the thermal plate 46 and the first shield member 52.

Referring again to FIG. 3, the first and second shield members 52, 54 effectively form a Faraday shield around the microprocessor card 12, thereby minimizing the leakage of high-frequency EMI generated by the microprocessor 48. More specifically, the first shield member 52 forms an EMI barrier around a first side of the microprocessor card 12, while the second shield member 54 and thermal plate 46 cooperate to form an EMI barrier on the opposite side of the microprocessor card 12. Collectively, then, the first and second shield members 52, 54 reduce the degree to which EMI may leak onto the motherboard 28. This advantageously prevents the formation of unwanted, high-frequency current loops on the motherboard 28, which, as will be appreciated, provides the ability to increase the processing speed of the microprocessor 48 without contravening FCC regulations against interfering with the high-frequency communication spectrum. The shielding arrangement of the present invention is also beneficial in that the reduction of high-frequency EMI emissions is accomplished completely within the microprocessor cartridge 30. This is advantageously cost effective in that it does not require any modifications to the motherboard 28.

Figure 6:
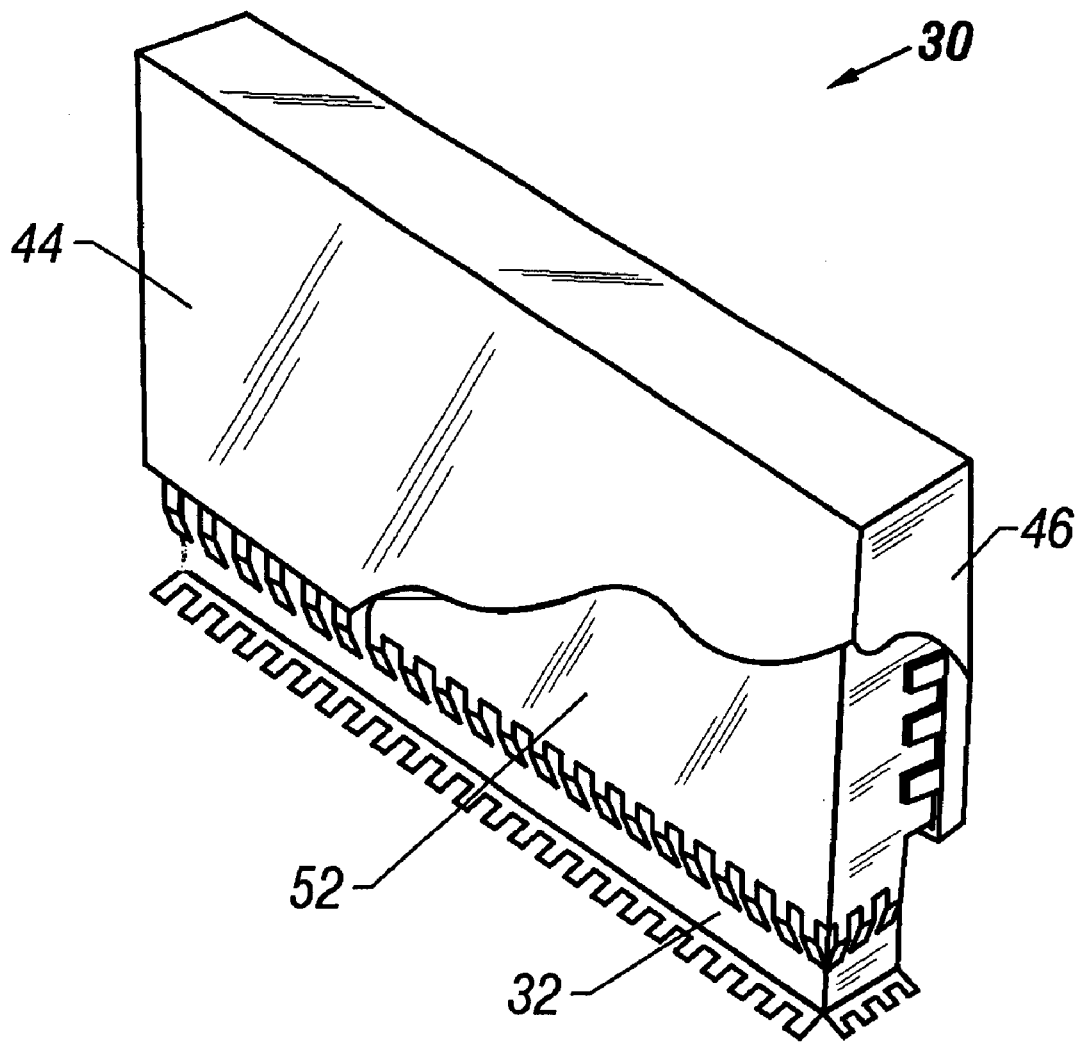
FIG. 6 is a partial cut-away view of the microprocessor cartridge shown in FIG. 2 incorporating a microprocessor shield assembly in accordance with another embodiment of the present invention.

It is to be readily understood that the EMI shield shown generally at 26 in FIG. 1 may take any of number of different shapes without departing from the spirit and scope of the present invention. For example, with reference to FIG. 6, the EMI shield may be provided such that it forms a full Faraday shield around the microprocessor (not shown) without actually contacting the substrate of the microprocessor card (not shown). This is accomplished by providing the first and second shield members 52, 54 such that they couple directly to the connector 32 as opposed to the ground points on the substrate of the microprocessor card (not shown). More specifically, the first shield member 52 establishes a direct couple to the connector 32, while the second shield member (not shown) establishes a direct couple between the thermal plate 46 and the connector 32. In this fashion, a full Faraday shield is formed by establishing a direct path between the EMI shield and the motherboard (not shown), thereby reducing the emission of EMI from the microprocessor (not shown).

It is furthermore contemplated that the EMI shield of the present invention may be constructed in accordance with the following non-exhaustive list of embodiments. For example, the EMI shield of the present invention may comprise a one piece shield assembly rather than the two-piece shield assembly shown in FIGS. 3–6. The EMI shield may be formed by applying a metallic coating on the inside of the microprocessor cartridge 30 shown generally in FIGS. 2 and 6. The EMI shield 26 may also comprise one or more inserts having a metallic surface, wherein the inserts are capable of being placed within the microprocessor cartridge 30 for preventing the emission of EMI. It is furthermore within the scope of the invention to construct the EMI shield 26 by embedding a plurality of small conductive particles within one or more plastic cover members for enclosing the microprocessor card 12 within an effective Faraday shield. The EMI shield 26 may also be formed by constructing the cover member 44 of the microprocessor cartridge 30 from a metallic substance such that, in conjunction with the metallic thermal plate 46, a full Faraday shield is formed about the microprocessor card 12.

Figure 7:
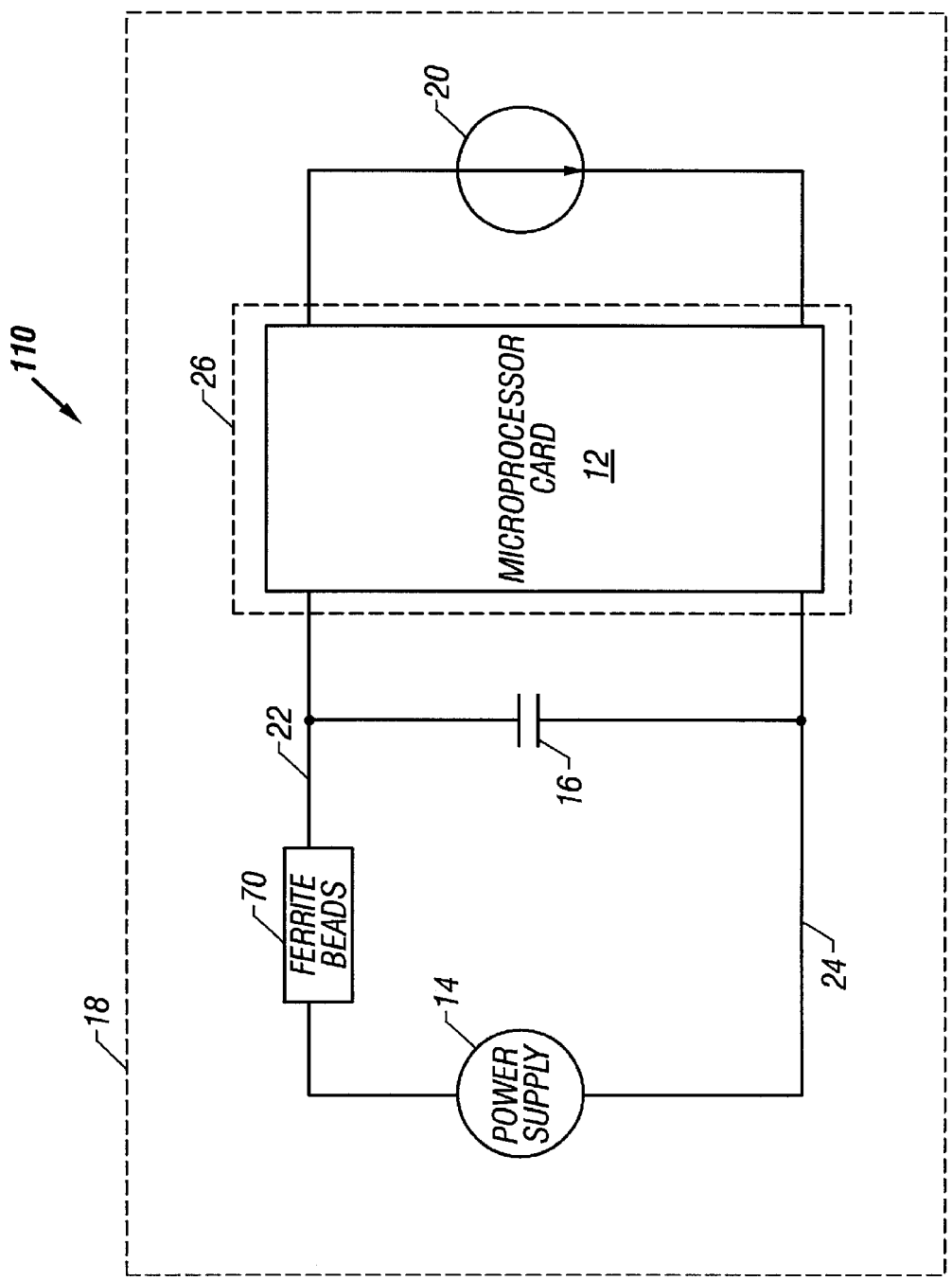
FIG. 7 is a schematic diagram of a microcomputing system having a microprocessor card disposed within an EMI shield and a block of ferrite beads disposed along the power delivery path in accordance with another embodiment of the present invention.

Referring now to FIG. 7, shown is a microcomputing system 110 incorporating an apparatus and method for reducing EMI in accordance with a second embodiment of the present invention. The difference between the microcomputing system 10 of FIG. 1 and the microcomputing system 110 of FIG. 7 is the addition of a block of ferrite beads 70 in series with the power delivery path 22. With the exception of the ferrite beads 70, all components of the microcomputing system 110 are identical to that disclosed with reference to FIG. 1, such that a detailed discussion of the remaining components is deemed duplicative and therefore unnecessary.

The ferrite beads 70 advantageously combat any leakage of high-frequency current from the microprocessor card 12 that may occur along the power delivery path 22. As will be explained in greater detail below, such high-frequency current leakage may occur along the power delivery path 22 due to resonance formed between the board capacitance of the microprocessor card 12 and the inductive and resistive parasitic elements of the decoupling capacitor 16. This is disadvantageous in that, at the resonant frequencies, the high-frequency current may readily leak to the motherboard at full magnitude and thus form a large current loop on the motherboard. Forming a large current loop on the motherboard, in turn, increases the likelihood of emitting unwanted high-frequency EMI from the microcomputing system 110.

Figure 9:
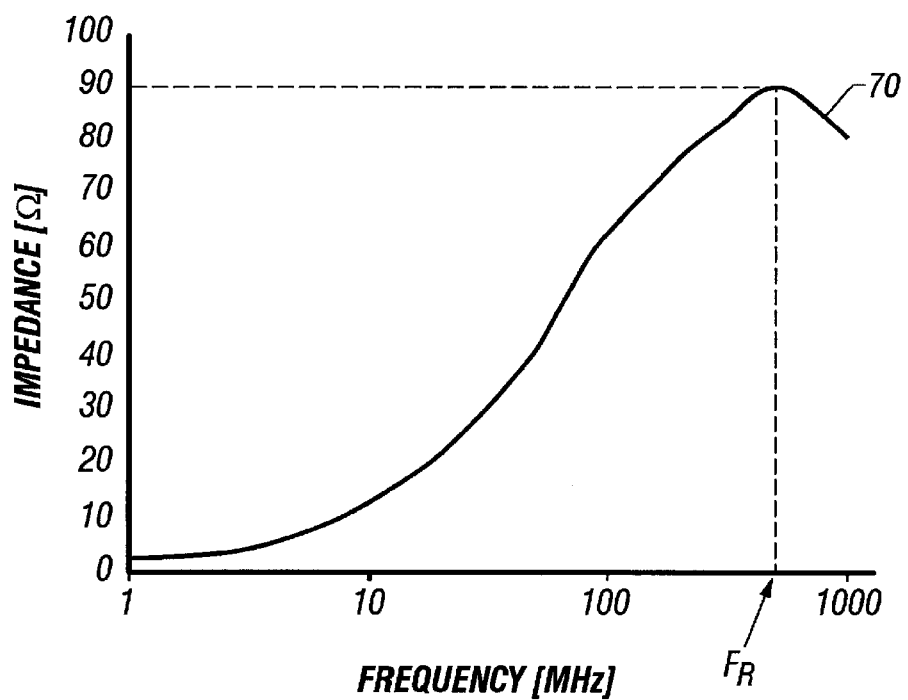
FIG. 9 is a graph illustrating the impedance characteristics of the ferrite beads employed in the embodiment shown in FIG. 8.

The ferrite beads 70 of the present invention counter this resonance effect by forming a high impedance path along the power delivery path 22 at the resonant frequencies of the EMI shield 26. Attenuating the high-frequency current leakage in this fashion effectively minimizes the amplitude of the current flowing on the motherboard, and thus minimizes the degree to which EMI is emitted from the microcomputing system 110. With reference to FIG. 9, this is accomplished by capitalizing on the fact that ferrite beads have a high impedance at the approximate resonant frequency ($F_R$) of the EMI shield 26 and low impedance at frequencies much lower than the resonant frequency. Selecting the ferrite beads 70 such that their impedance is high at the approximate resonant frequency of the EMI shield 26 effectively reduces the degree to which high-frequency current is allowed to migrate from the microprocessor card 12 to the motherboard via the power delivery path 22. The ferrite beads 70 will thus attenuate currents at the approximate resonant frequency without degrading the power delivery performance due to the low impedance of the ferrite beads 70 at the frequencies relevant to power delivery transients.

Figure 8:
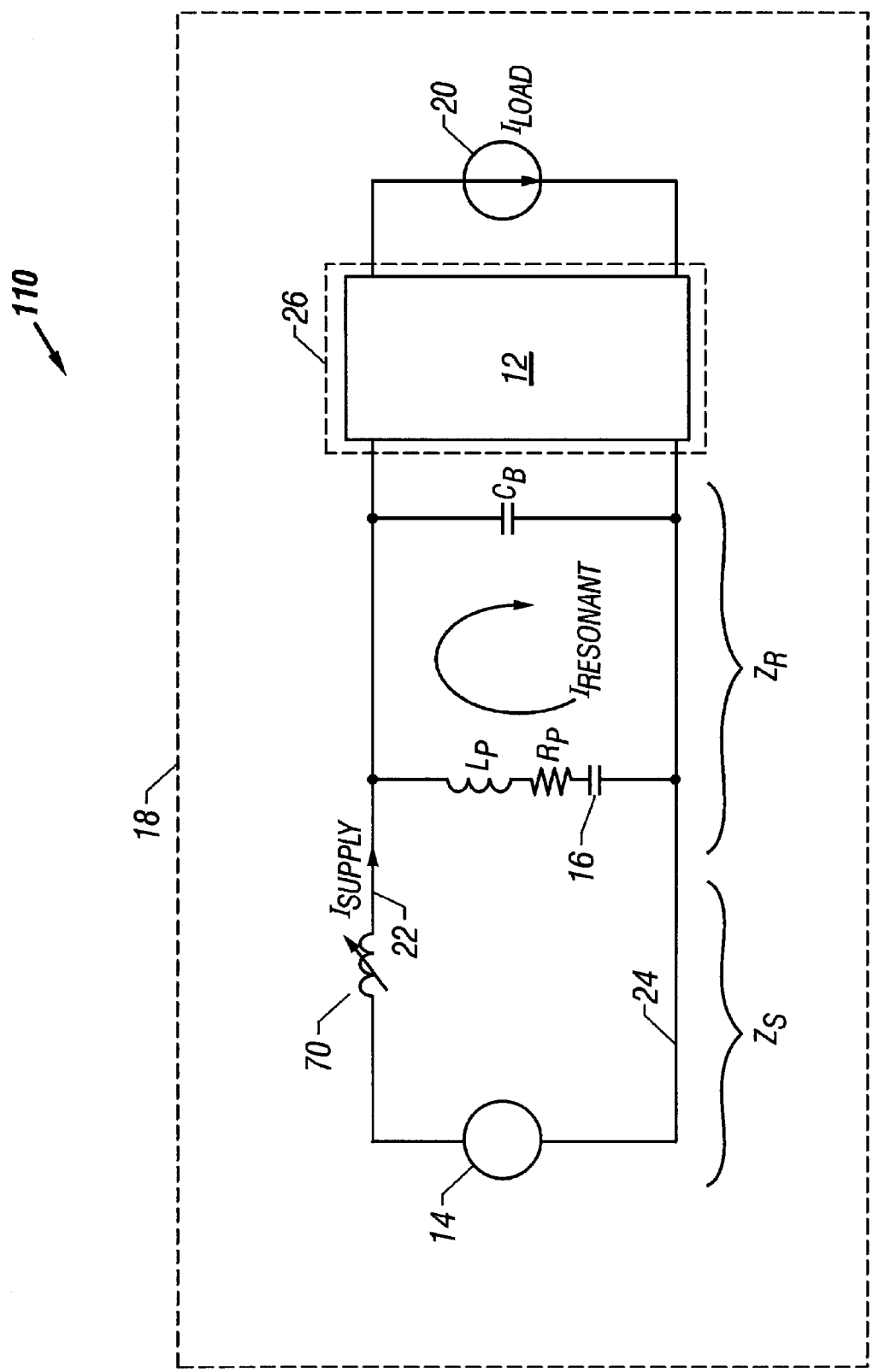
FIG. 8 is a circuit diagram of the microcomputing system shown in FIG. 7 illustrating the equivalent resistance $R_P$ and inductance $L_P$ from the decoupling capacitor, the equivalent capacitance $C_B$ from the motherboard, and the resulting resonant current loop ($I_{resonant}$) that develops on the motherboard.

FIG. 8 illustrates one embodiment of the microcomputing system 110 shown generally in FIG. 7. By way of example only, the decoupling capacitor 16 is shown as a single capacitor having a capacitance of approximately 22 $\mu$F representing the parallel combination of twenty-two individual 1 $\mu$F decoupling capacitors (not shown) employed along the input lines of the microprocessor card 12. The parasitic elements of the decoupling capacitor 16 include an equivalent series inductance ($L_P$) and an equivalent series resistance ($R_P$). Based on the 22 $\mu$F value of the decoupling capacitor 16, the equivalent series inductance ($L_P$) is approximately 136 pH and the equivalent series resistance ($R_P$) is approximately 2.3 M$\Omega$. The equivalent board capacitance ($C_B$) of the microprocessor card 12 is approximately 314 pF. As noted above, the parasitic elements ($L_P$, $R_P$) combine with the board capacitance ($C_B$) to form a resonant current loop ($I_{RESONANT}$) on the motherboard at the approximate resonant frequency of the EMI shield 26.

The influx of high-frequency current from the microprocessor card 12 onto the motherboard causes the resonant current loop ($I_{RESONANT}$) to be at a maximum value at the approximate resonant frequency ($F_R$). This adversely affects the power delivery efficiency of the microcomputing system 110 at the resonant frequencies. As used herein, the term "power delivery efficiency" is defined as the ratio of supply current ($I_{SUPPLY}$) delivered by the power supply 14 to the load current ($I_{LOAD}$) delivered by the microprocessor card 12. The power delivery efficiency is adversely affected at the resonant frequencies because the leakage of high-frequency current from the microprocessor card 12 into the resonant current loop ($I_{RESONANT}$) decreases the amount of load current ($I_{LOAD}$). To improve the power delivery efficiency of the microcomputing system 110, the ferrite beads 70 should be chosen having approximately the same approximate resonant frequencies as the resonant frequencies of the EMI shield 26 so as form a high impedance path along the power delivery path 22 which attenuates any leakage current.

Resonant frequency can be determined mathematically from the following equation: $F_R = (1/2\pi) \cdot (1/\sqrt{L_P \cdot ((C_{116} \cdot C_B)/(C_{116} + C_B))})$. Based on the exemplary component values set forth above, the resonant frequency ($F_R$) is approximately 800 MHz. In accordance with the present invention, the ferrite beads 70 should be selected having a high impedance at the resonant frequencies of the EMI shield 26. In one embodiment, the ferrite beads 70 include five individual BLM1 1P600S ferrite beads manufactured by Murata. Five ferrite beads 70 are set forth in this embodiment for power handling purposes in that each bead 70 can only handle a limited amount of D.C. current. Power handling considerations may dictate increasing or decreasing the number of ferrite beads 70 to adequately handle the current in a given application. The frequency response of these ferrite beads 70 is illustrated in FIG. 9, wherein it can be seen that the impedance of the ferrite beads 70 is at a maximum at a resonant frequency of approximately 800 MHz. By identifying the approximate resonant frequency ($F_R$) of the EMI shield 26, the appropriate ferrite beads 70 may thus be selected to form a high impedance path along the power delivery path 22 which effectively attenuates any high-frequency leakage that occurs at the resonant frequency ($F_R$).

Figure 10:
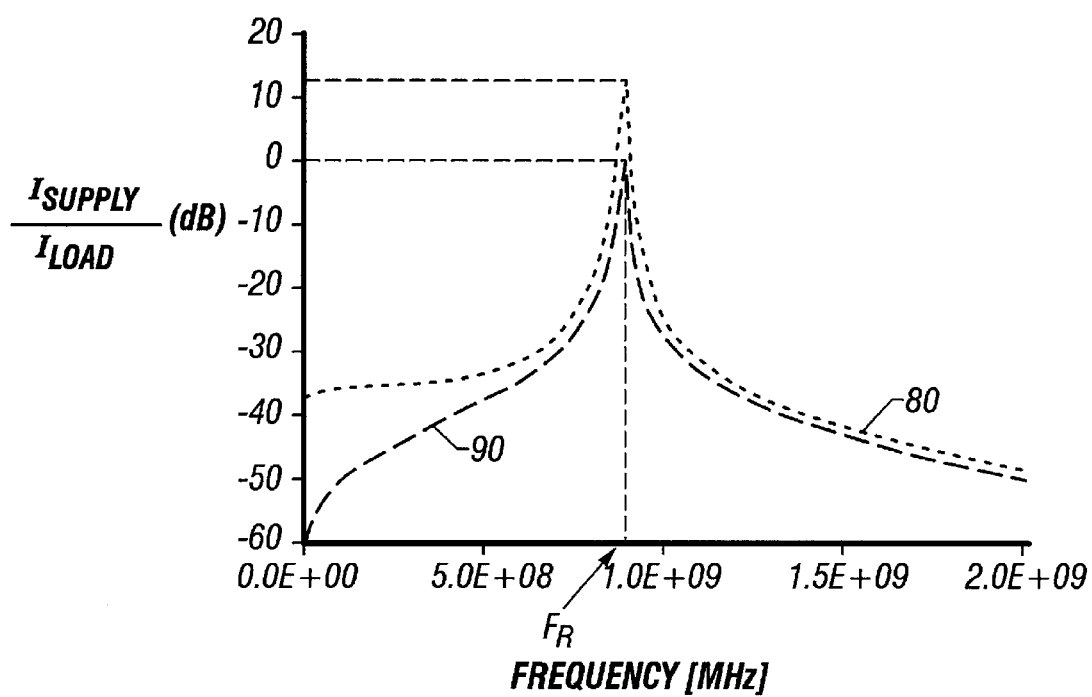
FIG. 10 is a graph illustrating the manner in which the combined use of the EMI shield and ferrite beads reduces the resonant amplitude ($I_{SUPPLY}/I_{LOAD}$) at the approximate resonant frequency ($F_R$) of the EMI shield.

FIG. 10 illustrates the effect of properly chosen ferrite beads 70 on the power delivery efficiency of the microcomputing system 110. By way of comparison, a waveform 80 represents the power delivery efficiency of the microcomputing system 110 without ferrite beads 70, while a waveform 90 represents the power delivery efficiency of the microcomputing system 110 with the five ferrite beads 70 discussed above. The power delivery efficiency ($I_{SUPPLY}/I_{LOAD}$) for the non-ferrite bead embodiment (waveform 80) at the resonant frequency ($F_R$) is approximately 12 decibels. This indicates that a certain amount of the load current ($I_{LOAD}$) was allowed to migrate from the EMI shield 26, and thus added to the resonant current loop ($I_{RESONANT}$) on the motherboard. The power delivery efficiency ($I_{SUPPLY}/I_{LOAD}$) for the ferrite bead embodiment (waveform 90) at the resonant frequency ($F_R$) is approximately 0 decibels. This represents an almost perfect one-to-one transfer of power from the power supply 14 to the current load 20 of the microprocessor card 12 with negligible leakage of high-frequency current from within the EMI shield 26.

The relationship between ferrite beads 70 and the power delivery efficiency of the microcomputing system 110 may be represented by the following equation:

$$\frac{I_{SUPPLY}}{I_{LOAD}} \alpha \frac{Z_R}{Z_R + Z_S},$$

where: $I_{SUPPLY}$ is the supply current from the power supply 14;

$I_{LOAD}$ is the load current from the microprocessor card 12;

$Z_R$ is the impedance of the parallel resonant network (C16, $L_P$, $R_P$, and $C_B$); and $Z_S$ is the sum of the impedance of the ferrite beads 70 and power supply 14.

From the foregoing equation, it follows that the power delivery efficiency ($I_{SUPPLY}/I_{LOAD}$) is maximized when the sum of the impedance of the ferrite beads 70 and power supply 14 ($Z_S$) is increased. As noted above, the ferrite beads 70 are readily capable of increasing their impedance at the resonant frequencies ($F_R$). In so doing, the ferrite beads 70 provide an effective barrier against EMI leakage through the power delivery path 22, including at the approximate resonant frequency ($F_R$) of the EMI shield 26.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the invention is to cover all modifications, equivalents, and alternative falling within the spirit and scope of the invention as defined by the appended claims.

What is claimed is:

1. An apparatus, comprising:

a microprocessor;

a power supply to supply electrical power to the microprocessor;

a power delivery path coupled between the microprocessor and the power supply; and at least one ferrite bead disposed within the power delivery path to attenuate high-frequency current;

wherein said at least one ferrite bead forms a high impedance path at a resonant frequency of an electromagnetic interference shield.

2. The apparatus of claim 1, further comprising:

a Faraday shield disposed around said microprocessor.

3. The apparatus of claim 2, wherein:

said at least one ferrite bead forms a high impedance path at a resonant frequency of the Faraday shield.

4. The apparatus of claim 1, further comprising:

a capacitor coupled to the power delivery path in parallel with the microprocessor.

5. A method, comprising:

disposing at least one ferrite bead in a power delivery path between a power supply and a microprocessor to attenuate high frequency current;

wherein disposing at least one ferrite bead includes forming a high impedance path at a resonant frequency of an electromagnetic interference shield.

6. The method of claim 5, further comprising:

disposing a Faraday shield around said microprocessor.

7. The method of claim 6, wherein:

disposing at least one ferrite bead includes forming a high impedance path at a resonant frequency of the Faraday shield.

8. The method of claim 5, further comprising:

coupling a capacitor to the power delivery path in parallel with the microprocessor.

9. A system, comprising:

a microprocessor card in a microprocessor system;

a microprocessor coupled to the microprocessor card;

a power supply to supply electrical power to the microprocessor;

a power delivery path coupled between the microprocessor and the power supply;

at least one ferrite bead disposed within the power delivery path to attenuate high-frequency current;

wherein said at least one ferrite bead forms a high impedance path at a resonant frequency of an electromagnetic interference shield.

10. The system of claim 9, further comprising:

a Faraday shield disposed around said microprocessor.

11. The system of claim 10, wherein:

said at least one ferrite bead forms a high impedance path at a resonant frequency of the Faraday shield.

12. The system of claim 9, further comprising a capacitor coupled to the power delivery path in parallel with the microprocessor.

* * * * *